US010808803B2

(12) United States Patent
Osaki et al.

(10) Patent No.: US 10,808,803 B2
(45) Date of Patent: Oct. 20, 2020

(54) SPEED REDUCER AND ACTUATOR

(71) Applicant: KABUSHIKI KAISHA YASKAWA DENKI, Kitakyushu-shi, Fukuoka (JP)

(72) Inventors: Mikio Osaki, Fukuoka (JP); Tuyoshi Nonaka, Fukuoka (JP)

(*) Notice: Subject to any disclaimer, the term of this patent is extended or adjusted under 35 U.S.C. 154(b) by 58 days.

(21) Appl. No.: 16/053,734

(22) Filed: Aug. 2, 2018

(65) Prior Publication Data
US 2019/0048975 A1  Feb. 14, 2019

(30) Foreign Application Priority Data

Aug. 8, 2017  (JP) ................................. 2017-153447

(51) Int. Cl.
*F16H 1/00* (2006.01)
*F16H 1/22* (2006.01)
*F16H 1/14* (2006.01)

(52) U.S. Cl.
CPC ............. *F16H 1/222* (2013.01); *F16H 1/145* (2013.01)

(58) Field of Classification Search
CPC ........ F16H 1/222; F16H 1/145; H02K 7/1163
USPC .......................................................... 74/410
See application file for complete search history.

(56) References Cited

U.S. PATENT DOCUMENTS

| | | | | |
|---|---|---|---|---|
| 2,000,605 A | * | 5/1935 | Moorhouse | ............... F16H 3/16 475/203 |
| 2,187,614 A | * | 1/1940 | Ormsby | .................. F16H 1/145 475/198 |
| 2,565,539 A | * | 8/1951 | Wildhaber | ................ F16H 3/08 74/410 |
| 2,905,007 A | * | 9/1959 | Carlson | ..................... B23Q 5/56 74/409 |
| 8,833,196 B2 | * | 9/2014 | Furuichi | .................. B25J 9/042 74/490.01 |
| 2006/0219036 A1 | * | 10/2006 | Michioka | ................ F16H 1/145 74/411 |

(Continued)

FOREIGN PATENT DOCUMENTS

| | | |
|---|---|---|
| EP | 1016581 | 7/2000 |
| JP | S55-168754 | 12/1980 |
| JP | H10-038036 | 2/1998 |

(Continued)

OTHER PUBLICATIONS

Extended Search Report in corresponding European Application No. 18182889.8, dated Nov. 29, 2018.

(Continued)

*Primary Examiner* — Victor L Macarthur
(74) *Attorney, Agent, or Firm* — Soei Patent & Law Firm

(57) ABSTRACT

A speed reducer includes a gear, a pinion gear, a movable portion holding the gear so as to be rotatable around a first axis, and a movable portion holding the pinion gear so as to be rotatable around a second axis non-parallel to the first axis. The gear has an annular power transmission portion surrounding the first axis on one side in a direction along the first axis. The pinion gear has a power transmission portion facing the power transmission portion and transmitting rotational torque on an outer periphery. The movable portion has a bearing portion holding the pinion gear inside the power transmission portion and a bearing portion holding the pinion gear outside the power transmission portion.

20 Claims, 6 Drawing Sheets

(56) References Cited

U.S. PATENT DOCUMENTS

2009/0314120 A1* 12/2009 Larsson ............... B25J 19/0029
74/490.02

FOREIGN PATENT DOCUMENTS

| JP | 2003-172435 | 6/2003 |
| JP | 2011-052813 | 3/2011 |
| JP | 2016-109295 | 6/2016 |
| JP | 2017-106533 | 6/2017 |
| WO | 2013/043202 | 3/2013 |

OTHER PUBLICATIONS

Office Action issued in European Patent Application No. 18182889.8 dated Jan. 30, 2020.

* cited by examiner

SPEED REDUCER AND ACTUATOR

CROSS-REFERENCE TO RELATED APPLICATION

This application is based upon and claims the benefit of priority from Japanese Patent Application No. 2017-153447 filed on Aug. 8, 2017, the entire contents of which are incorporated herein by reference.

BACKGROUND

1. Field

The present disclosure relates to a speed reducer and an actuator.

2. Description of the Related Art

Japanese Unexamined Patent Publication No. H10-38036 discloses a bevel gear device. This bevel gear device is provided by a ring gear disposed along an x direction and a y direction and having an axial center along a z direction, a pinion gear having an axial center along the x direction, and a gear box in which the ring gear and the pinion gear are rotatably assembled.

SUMMARY

A speed reducer as disclosed herein may include a first gear, a second gear, a first movable portion that holds the first gear so as to be rotatable around a first axis, and a second movable portion that holds the second gear so as to be rotatable around a second axis non-parallel to the first axis. The first gear has an annular first power transmission portion surrounding the first axis on one side in a direction along the first axis. The second gear has a second power transmission portion facing the first power transmission portion and transmitting power on an outer periphery. The second movable portion has an inner bearing portion that holds the second gear inside the first power transmission portion and an outer bearing portion that holds the second gear outside the first power transmission portion.

An actuator as disclosed herein may include a motor and a speed reducer. The speed reducer has a first gear, a second gear connected to the motor, a first movable portion that holds the first gear so as to be rotatable around a first axis, and a second movable portion that holds the second gear so as to be rotatable around a second axis non-parallel to the first axis. The first gear includes an annular first power transmission portion surrounding the first axis on one side in a direction along the first axis. The second gear includes a second power transmission portion facing the first power transmission portion and transmitting power on an outer periphery. The second movable portion includes an inner bearing portion that holds the second gear inside the first power transmission portion and an outer bearing portion that holds the second gear outside the first power transmission portion.

DETAILED DESCRIPTION

Figure 1:
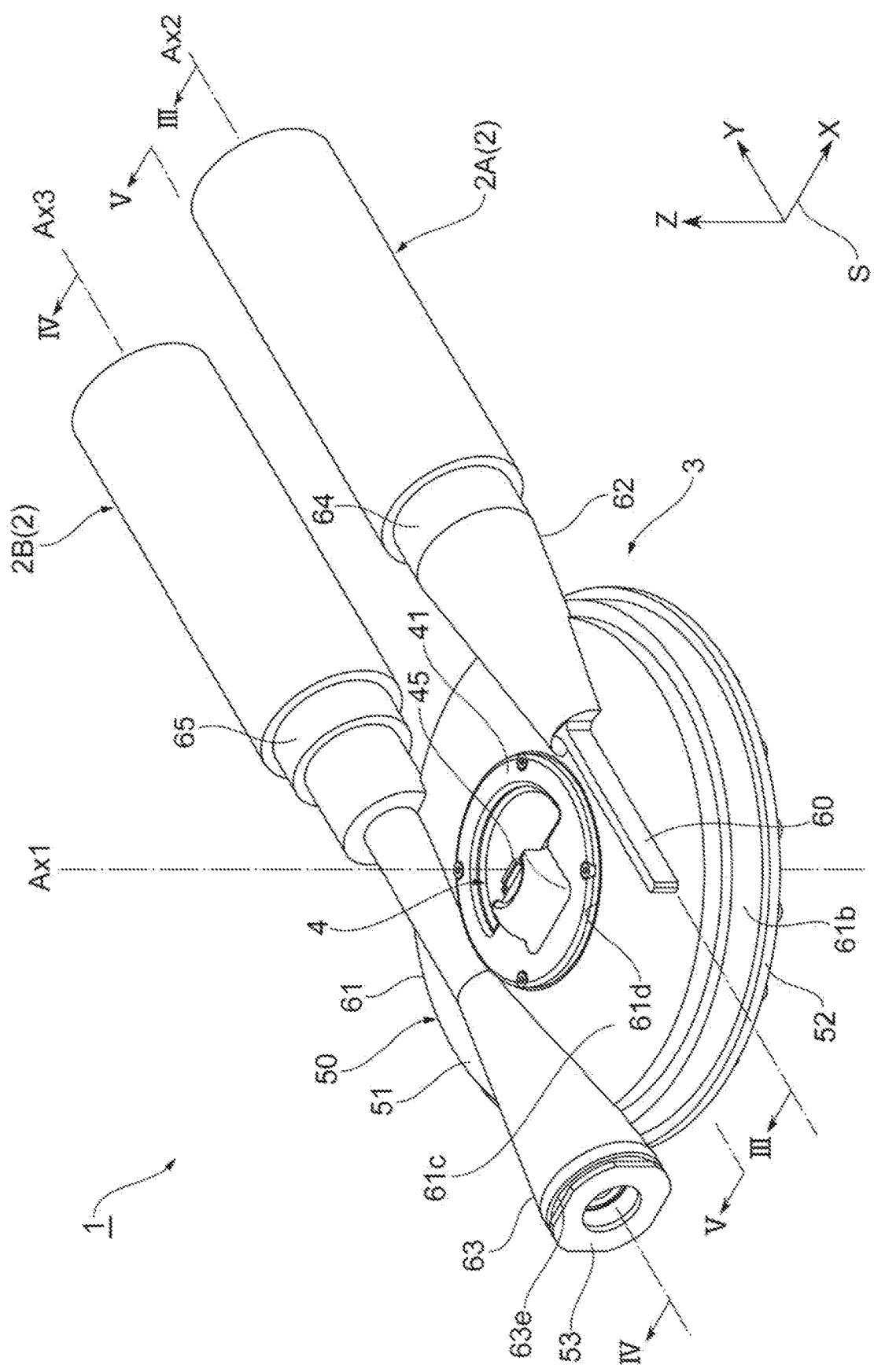
FIG. 1 is a schematic view showing a schematic configuration according to an example actuator.

In the following description, with reference to the drawings, the same elements or elements having the same function are denoted by the same reference numerals, and overlapping description may be omitted.

[Actuator]

Figure 2:
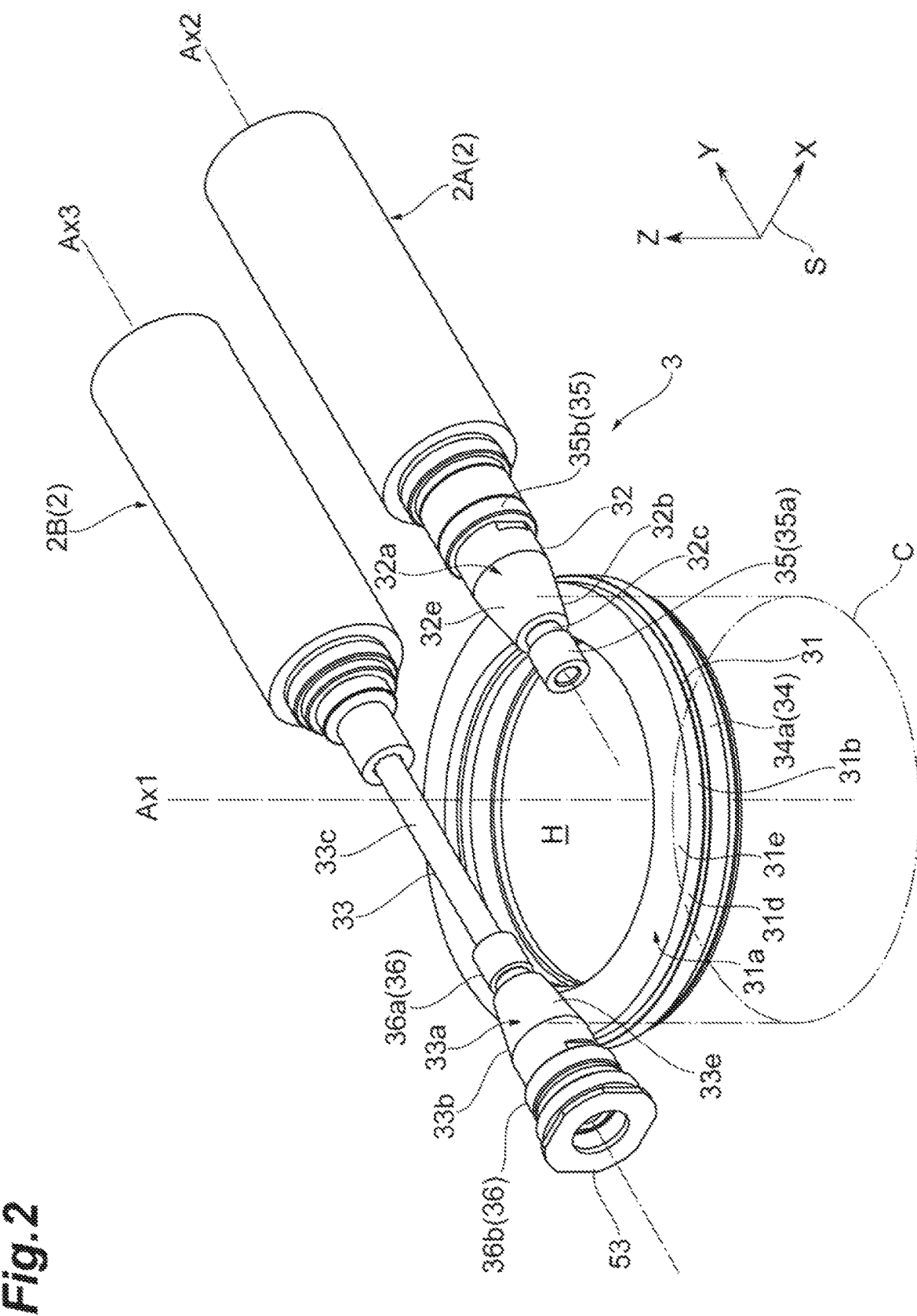
FIG. 2 is a perspective view showing an arrangement relationship between a gear and pinion gears shown in FIG. 1.

An example of an actuator will be described with reference to FIGS. 1 and 2. An actuator 1 may be used, for example, in an articulated robot or a wearable robot for assisting a human body and drives an object to be driven such as an arm. The actuator 1 is, for example, a twin motor type. As shown in FIGS. 1 and 2, the actuator 1 includes two motors 2, a speed reducer 3, and an encoder 4 (a sensor).

[Motor]

The motor 2 is, for example, a rotary electric motor, and functions as a power source of the actuator. The motor 2 has a shaft 22 (see FIG. 3) and a stator and a rotor (not shown) for rotating the shaft 22. It should be noted that the motor 2 may be any type of motor as long as the motor can function as a power source. For example, the motor 2 may be a hydraulic motor. Hereinafter, the two motors 2 are distinguished as motors 2A, 2B.

[Speed Reducer]

The speed reducer 3 transmits rotational torque (power) of the motor 2 to the above-described object to be driven at a rotational speed lower than a rotational speed of the motor 2. The speed reducer 3 is a gear pair disposed at a position where input and output shafts are non-parallel to each other (for example, orthogonal), and is, for example, a double pinion type hypoid gear. A configuration in which the input and output shafts are non-parallel relative to each other is not limited to cases where the input and output shafts are in orientations that cross each other on a same plane, and also includes cases where the input and output shafts are in orientations that three-dimensionally cross each other on different planes (that is, for example, a case where the input and output shafts are in a skewed position with respect to each other).

The speed reducer 3 includes a gear 31 (a first gear), pinion gears 32, 33 (second and third gears), and movable portions 34, 35, 36. The gear 31 functions as an output shaft for connection to the object to be driven. The pinion gears 32, 33 are connected to the motors 2A, 2B, respectively, and function as input shafts for transmitting rotational torque from the motors 2A, 2B to the gear 31, respectively. The movable portion 34 (a first movable portion) holds the gear 31 so as to be rotatable around an axis Ax1 (a first axis). The movable portion 35 (a second movable portion) holds the pinion gear 32 so as to be rotatable around an axis Ax2 (a second axis) non-parallel to (for example, orthogonal to) the axis Ax1. The movable portion 36 (third movable portion) holds the pinion gear 33 so as to be rotatable around an axis Ax3 (the third axis) non-parallel to the axis Ax1. The axes Ax2, Ax3 are parallel to each other.

Hereinafter, for convenience of explanation, an orthogonal coordinate system S in which a Z axis is along the axis Ax1, a Y axis is along the axes Ax2, Ax3, and an X axis is orthogonal to the axis Ax1 and the axes Ax2, Ax3 is defined, and an arrangement of elements will be explained by using the orthogonal coordinate system S.

The gear 31 has an annular power transmission portion 31a (a first power transmission portion) surrounding the axis Ax1 on one side (a Z axis positive side) in a direction along the axis Ax1. For example, the gear 31 has the power transmission portion 31a, a main body portion 31b, and a fitting portion 31c.

The main body portion 31b has a circular outer peripheral surface 31d with the axis Ax1 as a center, a first surface 31e facing one side of the axis Ax1 (the Z axis positive side), and a second surface 31f facing an opposite side of the first surface 31e (a Z axis negative side). An outer peripheral portion of the first surface 31e is, for example, formed in a conical shape. Specifically, the outer peripheral portion of the first surface 31e is inclined so as to be directed toward the second surface 31f side (the Z axis negative side) as a distance from the axis Ax1 increases. The power transmission portion 31a is formed on the outer peripheral portion of the conically-shaped first surface 31e. The power transmission portion 31a is, for example, a hypoid type tooth portion centered on the axis Ax1. The fitting portion 31c is a depressed portion formed over an entire periphery on the second surface 31f side of the outer peripheral surface 31d and is held by the movable portion 34.

In the gear 31, for example, a hollow portion H is formed in a portion inside the power transmission portion 31a (a position close to the axis Ax1 with respect to an inner peripheral edge of the power transmission portion 31a). The hollow portion H is formed in a portion of the main body portion 31b inside the power transmission portion 31a and opens to at least the first surface 31e. For example, the hollow portion H may have a first opening toward the first surface 31e. The hollow portion H may penetrate through the gear 31 along the axis Ax1. For example, the hollow portion H penetrates the main body portion 31b and opens to both of the first surface 31e and the second surface 31f. For example, the hollow portion H may have a second opening toward the second surface 31f. As a result, the gear 31 has a ring shape centered on the axis Ax1.

The hollow portion H may penetrate the gear 31 when the gear 31 is viewed alone, and by disposing a member other than the gear 31 in the hollow portion H, part or all of the hollow portion H may be closed (for example, as described later, the hollow portion H is covered with an encoder holding portion 41).

Each of the pinion gears 32, 33 has a power transmission portion 32a, 33a (a second power transmission portion and a third power transmission portion) facing the power transmission portion 31a and transmitting rotational torque on an outer periphery.

The pinion gear 32 has a gear main body 32b, the power transmission portion 32a, a first shaft 32c, and a second shaft 32d. The pinion gear 32 is connected to, for example, the motor 2A. The gear main body 32b includes an outer peripheral surface 32e surrounding the axis Ax2 and is disposed so that the outer peripheral surface 32e faces the power transmission portion 31a of the gear 31. As the outer peripheral portion of the first surface 31e of the gear 31 is conically shaped, the outer peripheral surface 32e of the pinion gear 32 decreases in diameter toward an inner peripheral side of the power transmission portion 31a.

The power transmission portion 32a is formed on the outer peripheral surface 32e. The power transmission portion 32a is, for example, a hypoid type tooth portion centered on the axis Ax2 and meshes with the power transmission portion 31a. As a result, rotational torque may be transferred from the pinion gear 32 to the gear 31 while converting rotational torque around the axis Ax2 into rotational torque around the axis Ax1.

The first shaft 32c protrudes from the gear main body 32b to one side (a Y axis negative side) along the axis Ax2 and is located inside the power transmission portion 31a (e.g. located at a position close to or toward the axis Ax1 from the inner peripheral edge of the power transmission portion 31a). The second shaft 32d protrudes from the gear main body 32b to another side (a Y axis positive side) along the axis Ax2 and is located outside the power transmission portion 31a (e.g. located at a position distant from the axis Ax1 from an outer peripheral edge of the power transmission portion 31a).

Like the pinion gear 32, the pinion gear 33 has a gear main body 33b, the power transmission portion 33a, a first shaft 33c, and a second shaft 33d. The pinion gear 33 is disposed at a position which is point symmetrical with the pinion gear 32 with respect to the axis Ax1. The pinion gear 33 is connected to the motor 2B, for example.

The gear main body 33b includes an outer peripheral surface 33e surrounding the axis Ax3 and is disposed so that the outer peripheral surface 33e faces the power transmission portion 31a of the gear 31. As the outer peripheral portion of the first surface 31e of the gear 31 is formed in an conical shape, the outer peripheral surface 33e of the pinion gear 33 decreases in diameter toward the inner peripheral side of the power transmission portion 31a.

The power transmission portion 33a is formed on the outer peripheral surface 33e. The power transmission portion 33a is, for example, a hypoid type tooth portion centered on the axis Ax3 and meshes with the power transmission portion 31a. As a result, rotational torque may be transferred from the pinion gear 33 to the gear 31 while converting rotational torque around the axis Ax3 into the rotational torque around the axis Ax1.

The first shaft 33c protrudes from the gear main body 33b to one side (the Y axis positive side) along the axis Ax3. In some examples, the first shaft 33c protrudes in the same direction as the second shaft 32d of the pinion gear 32. The first shaft 33c crosses the inside of the power transmission portion 31a and protrudes to the outside of the power transmission portion 31a. The second shaft 33d protrudes to another side (the Y axis negative side) from the gear main body 33b along the axis Ax3 and is located outside the power transmission portion 31a.

Figure 3:
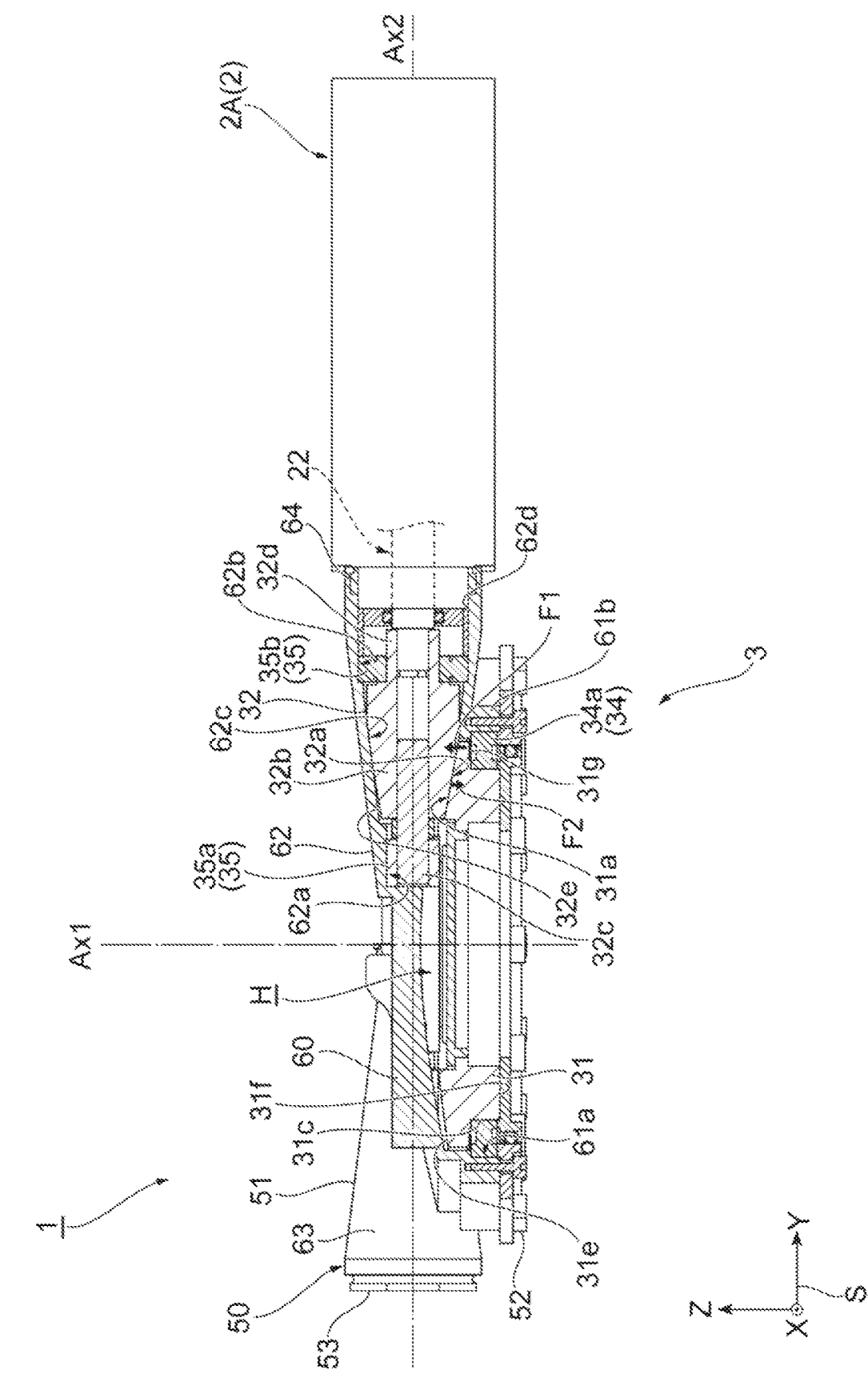
FIG. 3 is a cross-sectional view taken along a line in FIG. 1.
Figure 4:
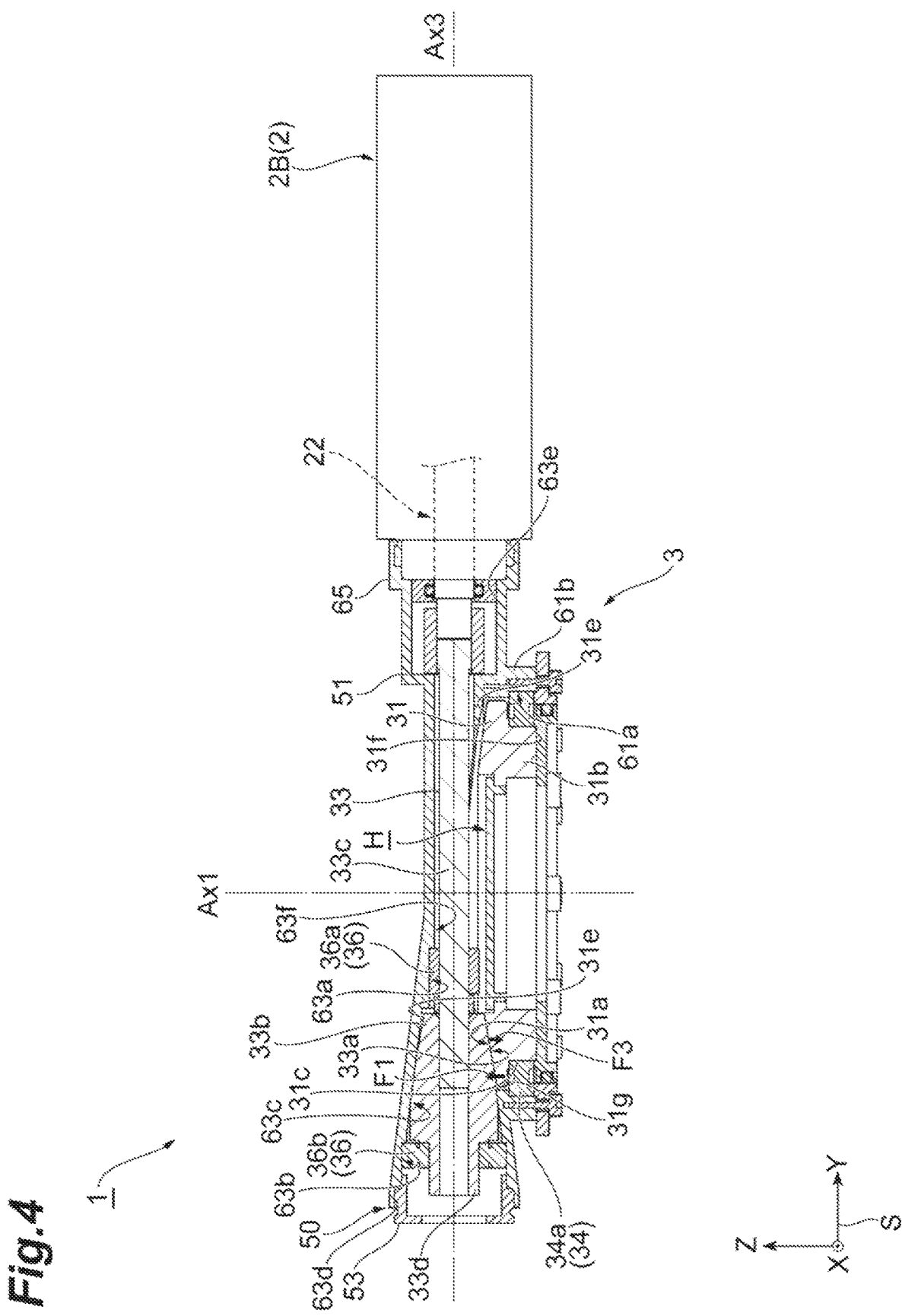
FIG. 4 is a cross-sectional view taken along a line IV-IV in FIG. 1.

With further reference to FIGS. 3 and 4, the movable portion 34, the movable portion 35, and the movable portion 36 will now be described.

As described above, the movable portion 34 holds the gear 31 so as to be rotatable around the axis Ax1. The movable portion 34 has, for example, a bearing portion 34a (a third bearing portion) that holds the gear 31 so as to surround the gear 31 from the outside of an inner periphery of the power transmission portion 31a (e.g. a position far from the axis Ax1 with respect to the inner peripheral edge of the power transmission portion 31a). For example, the third bearing portion 34a has an annular shape that defines an inner diameter and is configured to contact and hold the first gear 31, wherein the inner diameter of the third bearing portion 34a is larger than a diameter of the hollow portion H of the first gear 31. The bearing portion 34a also holds the gear 31 from the direction along the axis Ax1. The bearing portion 34a is, for example, an annular bearing (for example, a cross roller bearing). The bearing portion 34a may be a sliding bearing.

For example, the bearing portion 34a is attached to the fitting portion 31c from the other side (the Z axis negative side) in the direction along the axis Ax1 and is in contact with a back surface 31g opposite to the power transmission portion 31a. The bearing portion 34a is located outside a working pitch circle C between the gear 31 and the pinion gear 32 (e.g. located at a position farther from the axis Ax1, relative to the gear 31). In some examples, an effective action point of force F1 acting on the bearing portion 34a from the back surface 31g (force acting on the back surface 31g from the bearing portion 34a) is located outside an effective action point of force F2 acting on the power transmission portion 32a from the power transmission portion 31a (force acting on the power transmission portion 31a from the power transmission portion 32a).

Further, the bearing portion 34a is located outside a working pitch circle between the gear 31 and the pinion gear 33 (similar to the working pitch circle C between the gear 31 and the pinion gear 32). In some examples, the effective action point of the force F1 acting on the bearing portion 34a from the back surface 31g is located outside an effective action point of force F3 acting on the power transmission portion 33a from the power transmission portion 31a (force acting on the power transmission portion 31a from the power transmission portion 33a). The effective action point may include a point where resultant force acts.

As described above, the movable portion 35 holds the pinion gear 32 so as to be rotatable around the axis Ax1. The movable portion 35 has a bearing portion 35a (an inner bearing portion) for holding the pinion gear 32 inside the power transmission portion 31a and a bearing portion 35b (an outer bearing portion) for holding the pinion gear 32 outside the power transmission portion 31a. The bearing portion 35a is fitted to the first shaft 32c inside the power transmission portion 31a. The bearing portion 35b is fitted to the second shaft 32d outside the power transmission portion 31a. The bearing portions 35a, 35b are, for example, annular bearings (for example, needle bearings). The bearing portions 35a, 35b may be sliding bearings.

Similarly, the movable portion 36 holds the pinion gear 33 so as to be rotatable around the axis Ax3. The movable portion 36 has a bearing portion 36a (an inner bearing portion) for holding the pinion gear 33 inside the power transmission portion 31a and a bearing portion 36b (an outer bearing portion) for holding the pinion gear 33 outside the power transmission portion 31a. The bearing portion 36a is fitted to the first shaft 33c inside the power transmission portion 31a. The bearing portion 36b is fitted to the second shaft 33d outside the power transmission portion 31a. The bearing portions 36a, 36b are, for example, annular bearings (for example, needle bearings). The bearing portions 36a, 36b may be sliding bearings.

The bearing portions 35a, 36a are disposed at positions overlapping with the hollow portion H when viewed from a direction (a Z-axis positive direction) along the axis Ax1. In some examples, the hollow portion H opens toward the bearing portions 35a, 36a side in an area overlapping with the bearing portions 35a, 36a. For example, the bearing portions 35a, 36a are aligned with an opening of the hollow portion H. The bearing portions 35a, 36a may be positioned to face an opening of the hollow portion H. Note that at least a part of the bearing portions 35a, 36a may enter the hollow portion H.

Further, as shown in FIG. 1, the speed reducer 3 is provided with a case 50 for housing the gear 31 and the pinion gears 32, 33, for example. For example, the case 50 has a main body portion 51, a lid portion 52, and a lid portion 53.

The main body portion 51 is a unit (e.g. the main body portion is unitary), and includes a base portion 61, shell portions 62, 63, and mounting portions 64, 65. Incidentally, the term "unit" or "unitary" is not limited to a case where the portions or parts are integrally molded, but includes a case of being manufactured by undetachably integrating multiple parts. Specific examples of undetachable integration include, for example, welding or the like.

Figure 5:
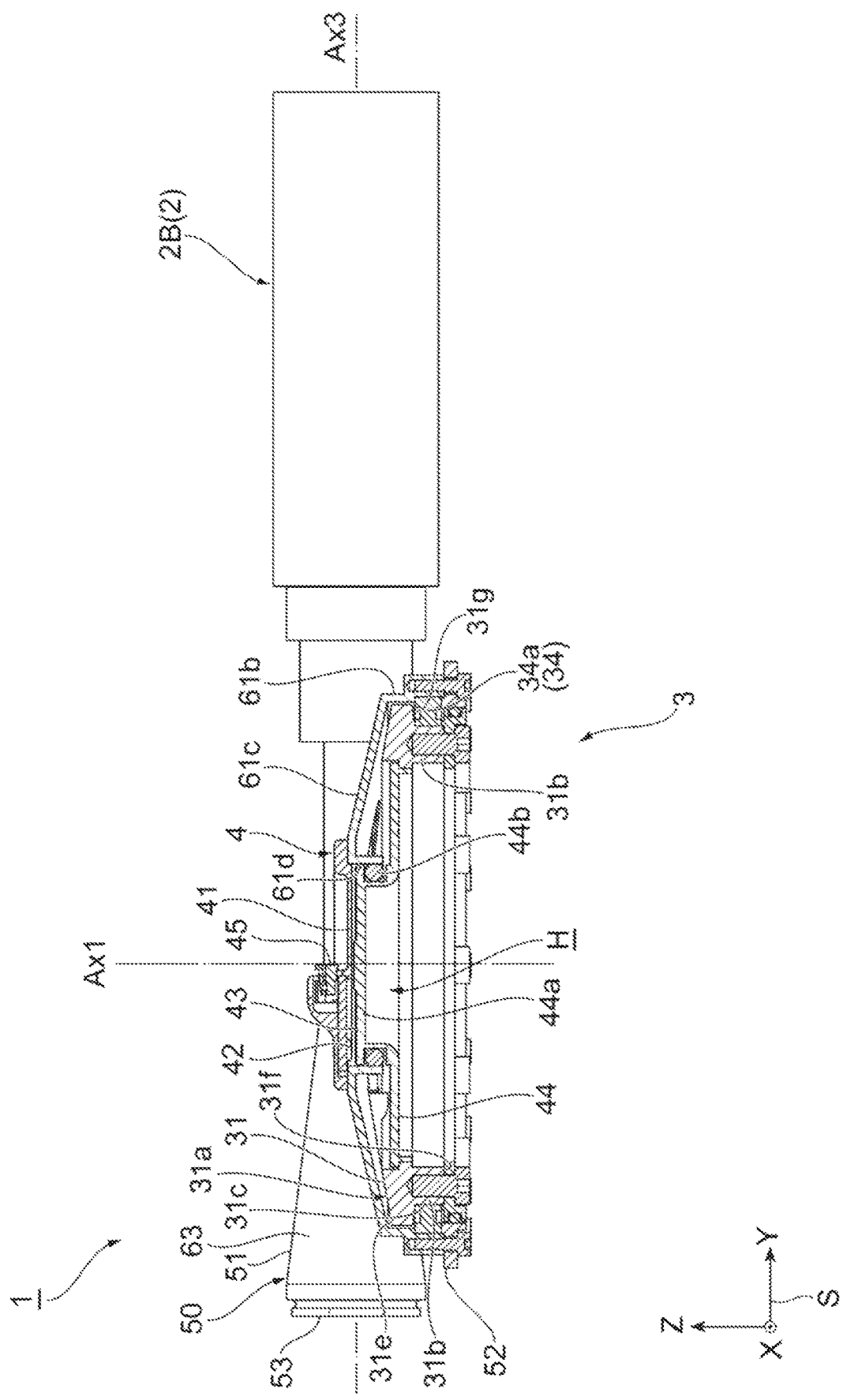
FIG. 5 is a cross-sectional view taken along a line V-V in FIG. 1.

As shown in FIGS. 3 to 5, the base portion 61 houses the gear 31, and provides a holding portion 61a (a third holding portion) for holding the bearing portion 34a inside (an inner surface side). The base portion 61 has an annular first wall portion 61b surrounding the outer peripheral surface 31d of the main body portion 31b and a second wall portion 61c covering the first surface 31e side of the main body portion. At a center of the second wall portion 61c, a circular opening portion 61d centered on the axis Ax1 is formed. The holding portion 61a is formed over an entire periphery of an inner peripheral surface of the first wall portion 61b. The holding portion 61a receives the bearing portion 34a from an opposite side of the second wall portion 61c and is fitted to an outer periphery of the bearing portion 34a.

The shell portion 62 widens in diameter, in a direction non-parallel to the axis Ax2 to house the pinion gear 32, and provides holding portions 62a, 62b for holding the bearing portions 35a, 35b inside (an inner surface side). For example, the shell portion 62 widens from the second wall portion 61c of the base portion 61 toward an opposite side of the gear 31.

The inside of the shell portion 62 is provided with a housing portion 62c for housing the gear main body 32b of the pinion gear 32, the holding portion 62a (a first holding portion) for holding the bearing portion 35a, and the holding portion 62b (a second holding portion) for holding the bearing portion 35b. The holding portion 62a is continued to one side in a direction along the axis Ax2 (the Y axis negative side) with respect to the housing portion 62c and is located inside the power transmission portion 31a of the gear 31. The holding portion 62a is fitted to an outer periphery of the bearing portion 35a. The holding portion 62b is continued to another side in the direction along the axis Ax2 (the Y axis positive side) with respect to the housing portion 62c and is located outside the power transmission portion 31a of the gear 31. The holding portion 62b is fitted to an outer periphery of the bearing portion 35b.

An opening portion 62d opened outward along the axis Ax2 is formed at an end on the holding portion 62b side of the shell portion 62. The bearing portions 35a, 35b and the pinion gear 32 are respectively disposed in the holding portions 62a, 62b and the housing portion 62c through the opening portion 62d.

The shell portion 63 widens in diameter in a direction non-parallel to the axis Ax3 to house the pinion gear 33, and provides holding portions 63a, 63b for holding the bearing portions 36a, 36b inside (an inner surface side). For example, similarly to the shell portion 62, the shell portion 63 widens from the second wall portion 61c of the base portion 61 toward the opposite side of the gear 31.

The inside of the shell portion 63 is provided with a housing portion 63c for housing the gear main body 33b of the pinion gear 33, the holding portion 63a (a first holding portion or an inner holding portion) for holding the bearing portion 36a, the holding portion 63b (a second holding portion or an outer holding portion) for holding the bearing portion 36b, and a housing portion 63f for housing the first shaft 33c extending through the bearing portion 36a. The holding portion 63a is continued to one side in a direction along the axis Ax3 (the Y axis positive side) with respect to the housing portion 63c and is located inside the power transmission portion 31a of the gear 31. The holding portion 63a is fitted to an outer periphery of the bearing portion 36a. The holding portion 63b is continued to another side in the direction along the axis Ax3 (the Y axis negative side) with respect to the housing portion 63c and is located outside the power transmission portion 31a of the gear 31. The holding portion 63b is fitted to an outer periphery of the bearing portion 36b. The housing portion 63f is continued to the one side (the Y axis positive side) in the direction along the axis Ax3 with respect to the holding portion 63a and extends along the axis Ax3 to house the first shaft 33c.

An opening portion 63d opened outward along the axis Ax3 is formed at an end on the holding portion 63b side of the shell portion 63. The bearing portions 36a, 36b and the pinion gear 33 are respectively disposed in the holding portions 63a, 63b and the housing portion 63c through the opening portion 63d. Further, an opening portion 63e opened outward along the axis Ax3 is formed at an end on the housing portion 63f side of the shell portion 63.

The mounting portion 64 is connected to the opening portion 62d of the shell portion 62. The motor 2A is mounted to the mounting portion 64. The motor 2A is disposed so that the shaft 22 enters the shell portion 62 along the axis Ax2 and is mounted to the mounting portion 64. The shaft 22 of the motor 2A is connected to the second shaft 32d of the pinion gear 32.

The mounting portion 65 is connected to the opening portion 63e of the shell portion 63. In some examples, the mounting portion 65 is provided on the same side (the Y axis positive side) as the mounting portion 64 in the direction along the axes Ax2, Ax3. The motor 2B is mounted to the mounting portion 65. The motor 2B is disposed so that the shaft 22 enters the shell portion 63 along the axis Ax3 and is mounted to the mounting portion 65. The shaft 22 of the motor 2B is connected to the first shaft 33c of the pinion gear 33.

Further, the main body portion 51 may further include a rib 60 extending from the shell portion 62 in a direction opposite to the holding portion 62b along the axis Ax2. The rib 60 is connected to the shell portion 62 and the second wall portion 61c of the base portion 61.

The lid portion 52 is mounted to the first wall portion 61b from the other side in the direction along the axis Ax1 (the Z axis negative side) and holds the bearing portion 34a in the holding portion 61a. The lid portion 52 is an annular plate-like member having the axis Ax1 as a center, and an outer peripheral portion of the lid portion 52 is fixed to the first wall portion 61b by bolts or the like.

The lid portion 53 is mounted to the shell portion 63 from an outer peripheral side of the first wall portion 61b of the base portion 61 in the main body portion 51 and holds the bearing portion 36b in the holding portion 63b. The lid portion 53 is screwed and fixed in the opening portion 63d, for example.

[Encoder]

The encoder 4 detects information on a rotation angle of the gear 31. At least a part of the encoder 4 is disposed in the hollow portion H.

As shown in FIGS. 1 and 5, the encoder 4 has an encoder holding portion 41, a light receiving element portion 42, a code wheel portion 43, and a pedestal portion 44. For example, the pedestal portion 44 of the encoder 4 is disposed in the hollow portion H.

The encoder holding portion 41 is provided in the opening portion 61d of the second wall portion 61c. On an inner surface of the encoder holding portion 41 (a surface facing an inside of the main body portion 51), the light receiving element portion 42 is installed. Further, for example, a connector 45 is installed in the encoder holding portion 41.

The pedestal portion 44 is disposed in the hollow portion H and fixed to the gear 31. Therefore, the pedestal portion 44 rotates together with the gear 31 around the axis Ax1. A central portion 44a of the pedestal portion 44 protrudes toward the second wall portion 61e side to enter the opening portion 61d, and faces the encoder holding portion 41 with a gap therebetween. A space between an outer peripheral surface of the central portion 44a and an inner peripheral surface of the opening portion 61d is sealed by a ring-shaped oil seal portion 44b, such as an O-ring.

The code wheel portion 43 is provided on a surface of the central portion 44a on the encoder holding portion 41 side and rotates together with the gear 31 around the axis Ax1. By reading this movement by the light receiving element portion 42, information on the rotation angle of the gear 31 can be detected.

As described above, the speed reducer 3 includes the gear 31, the pinion gear 32, the movable portion 34 that holds the gear 31 so as to be rotatable around the axis Ax1, and the movable portion 35 that holds the pinion gear 32 so as to be rotatable around the axis Ax1 that is non-parallel to the axis Ax1. The gear 31 has the annular power transmission portion 31a surrounding the axis Ax1 on one side in the direction along the axis Ax1. The pinion gear 32 has the power transmission portion 32a facing the power transmission portion 31a and transmitting rotational torque on the outer periphery. The movable portion 35 has the bearing portion 35a that holds the pinion gear 32 inside the power transmission portion 31a and the bearing portion 35b that holds the pinion gear 32 outside the power transmission portion 31a.

The pinion gear 32 of the speed reducer 3 is held at both ends by the bearing portion 35a and the bearing portion 35b, so that a reaction force generated by the transmission of the rotational torque to the power transmission portion 31a can be shared by the bearing portion 35a and the bearing portion 35b. Therefore, deformation caused by concentration of the reaction force may be suppressed and rigidity may be increased.

The speed reducer 3 may further include the pinion gear 33 and the movable portion 36 that holds the pinion gear 33 so as to be rotatable about the axis Ax3 non-parallel to the axis Ax1. Further, the pinion gear 33 may have the power transmission portion 33a facing the power transmission portion 31a and transmitting rotational torque on the outer periphery. The movable portion 36 may have the bearing portion 36a that holds the pinion gear 33 inside the power transmission portion 31a and the bearing portion 36b that holds the pinion gear 33 outside the power transmission portion 31a. In this case, the pinion gear 33 is also held at both ends by the bearing portion 36a and the bearing portion 36b. In this manner, each of the pinion gears 32, 33 can have a double-ended structure, to maintain high rigidity while achieving high torque by coordinating a plurality of gears.

The hollow portion H opened to the bearing portion 35a side (the bearing portion 36a side) in an area overlapping with the bearing portions 35a, 36a may be formed in a portion of the gear 31 inside the power transmission portion 31a. The hollow portion H may reduce weight of the entire speed reducer 3. Further, since the hollow portion H opened to the bearing portion 35a side in the area overlapping with the bearing portions 35a, 36a is formed, a degree of freedom of the positions where the bearing portions 35a, 36a are disposed can be increased, and an outer shape of the speed reducer 3 can be flattened, to improve compactness.

The hollow portion H may penetrate the gear 31 in the direction along the axis Ax1. By forming the hollow portion H so as to penetrate the gear 31 in the direction along the axis Ax1, to further reduce the weight. Further, since the hollow portion H penetrates the gear 31, the hollow portion H can also be used for wiring and the like, to further improve compactness.

The movable portion 34 may have the bearing portion 34a that holds the gear 31 so as to surround the gear 31 from the outside of the inner periphery of the power transmission portion 31a. By disposing the bearing portion 34a outside, it becomes easier to secure an arrangement space of the hollow portion II inside. In addition, rigidity of the movable portion 34 against tilting force on the gear 31 is increased, to more reliably improve both compactness and rigidity.

The bearing portion 34a may be located outside the working pitch circle of the gear 31 with the pinion gear 32. In this case, the rigidity can be increased more reliably.

The speed reducer 3 may further include the case 50 for housing the gear 31 and the pinion gear 32. The case 50 may have a unit including the holding portion 61a for holding the bearing portion 34a, the holding portions 62a, 63a for holding the bearing portions 35a, 36a, and the holding portions 62b, 63b for holding the bearing portions 35b, 36b (e.g. a unitary case 50). Since the bearing portion 34a for holding the gear 31, the bearing portions 35a, 35b for holding the pinion gear 32, and the bearing portions 36a, 36b for holding the pinion gear 33 are held by the unit, relative position accuracy between the gear 31 and the pinion gears 32, 33 can be improved.

The case 50 may have the shell portion 62 which widens in the direction non-parallel to the axis Ax2 and provides the holding portion 62a inside and the rib 60 which extends from the shell portion 62 in a direction opposite to the holding portion 62b along the axis Ax2. The holding portion 62a is reinforced by the rib 60, and the rigidity can be further enhanced.

Further, the actuator 1 may further include the encoder 4 that detects information on the rotation angle of the gear 31, and at least a part of the encoder 4 may be disposed in the hollow portion H. By disposing at least a part of the encoder 4 in the hollow portion H, compactness can be achieved.

Although examples have been described above, the present disclosure is not limited to the above-described examples, and various modifications are possible. For example, in addition to an articulated robot or a wearable robot for assisting a human body, the actuator can be applied to any application requiring driving. Also, the actuator need not be a twin motor type. The actuator may have one motor or may have three or more motors. In some examples, the speed reducer need not be a double pinion type. The speed reducer may transmit power from one pinion to the gear 31 or may transmit power from three or more pinions to the gear 31.

In the above-described examples, the speed reducer 3, which is a hypoid gear, is illustrated, but the speed reducer is not limited to include a hypoid gear. For example, the speed reducer may be a bevel gear, such as a bevel gear or a crown gear, or may be a combination of various gear pairs as long as input and output shafts are disposed at positions non-parallel to each other.

Figure 6:
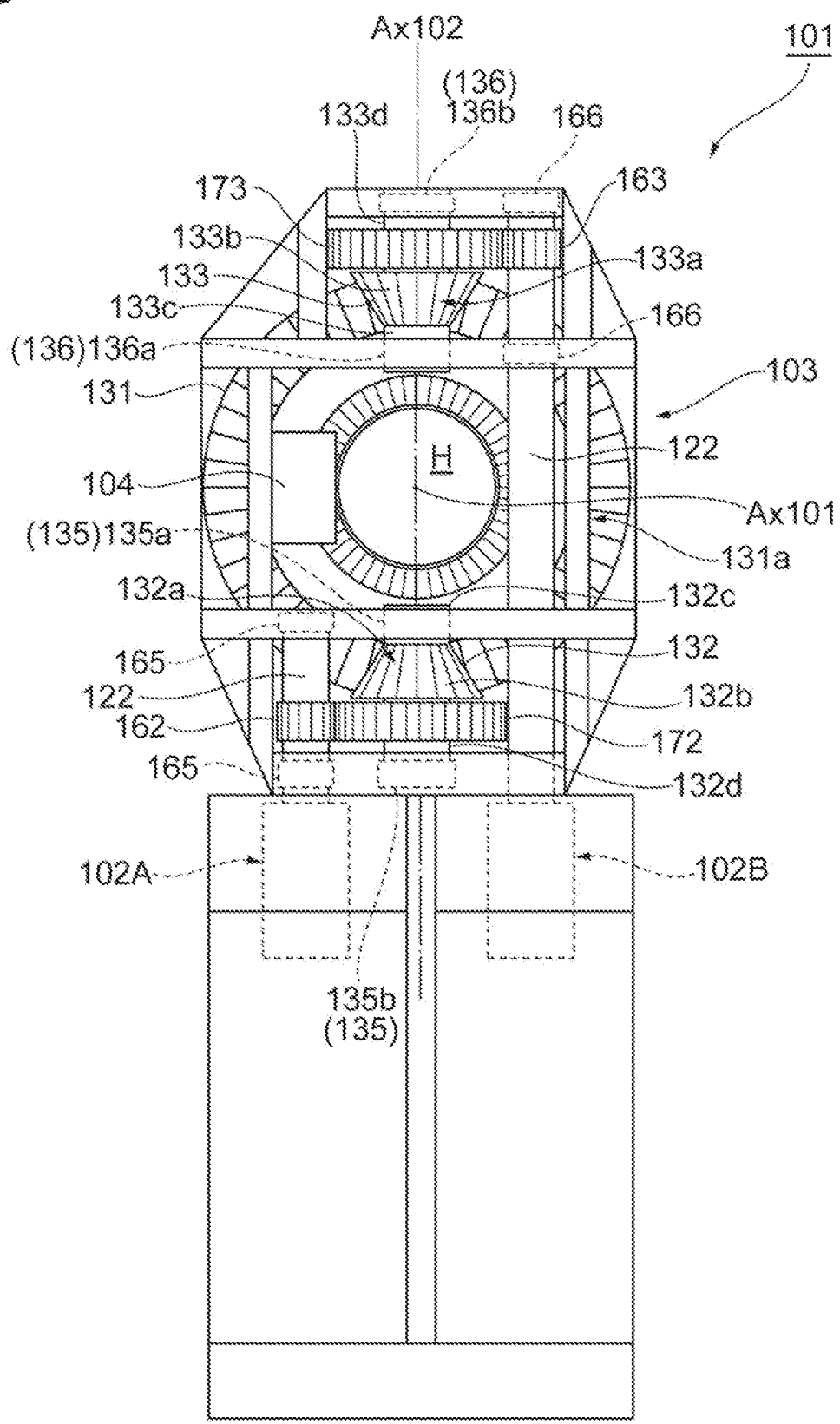
FIG. 6 is a schematic view showing a modified example of the actuator.

FIG. 6 is a schematic view showing a modified example of the actuator. An actuator 101 shown in FIG. 6 includes two motors 102A and 102B, a speed reducer 103, and an encoder 104. The speed reducer 103 has a gear 131 (a first gear) which is a ring-shaped bevel gear, pinion gears 132, 133 (second and third gears) corresponding to the gear 131, movable portions 135, 136 (second and third movable portions) which hold the respective pinion gears 132, 133 rotatably around an axis Ax102.

The gear 131 has an annular power transmission portion 131a (a first power transmission portion) that surrounds an axis Ax101 (a first axis) non-parallel to (for example, orthogonal to) the axis Ax102 on one side in a direction along the axis Ax101. Each of the pinion gears 132, 133 has a power transmission portion 132a, 133a (a second power transmission portion and a third power transmission portion) that faces the power transmission portion 131a and transmits rotational torque on an outer periphery. The movable portion 135 has a bearing portion 135a (an inner bearing portion) for holding the pinion gear 132 inside the power transmission portion 131a and a bearing portion 135b (an outer bearing portion) for holding the pinion gear 132 outside the power transmission portion 131a. The movable portion 136 has a bearing portion 136a (an inner bearing portion or an inner bearing portion) for holding the pinion gear 133 inside the power transmission portion 131a and a bearing portion 136b (an outer bearing portion) for holding the pinion gear 133 outside the power transmission portion 131a.

Further, the pinion gear 132 has a gear main body 132b in which the power transmission portion 132a is formed, a first shaft 132c protruding from the gear main body 132b to one side (a Y axis negative side) along the axis Ax102 (a second axis), and a second shaft 132d protruding from the gear main body 132b to another side (a Y axis positive side) along the axis Ax102. The pinion gear 133 has a gear main body 133b in which the power transmission portion 133a is formed, a first shaft 133c protruding from the gear main body 133b to one side (the Y axis positive side) along the axis Ax102, and a second shaft 133d protruding from the gear main body 133b to another side (the Y axis negative side) along the axis Ax102.

As shown in FIG. 6, in the actuator using the bevel gear, the pinion gears 132, 133 are arranged coaxially. Therefore, similarly to the speed reducer 3, when the pinion gears 132, 133 are directly connected to the motors 102A, 102B respectively, the motor 102A connected to the second shaft 132d and the motor 102B connected to the first shaft 133c interfere with each other. Therefore, the motors 102A, 102B are disposed so that respective shafts 122 pass through positions shifted from the axis Ax102 (e.g. the shafts 122 are offset relative to the axis Ax102).

Also, in order to connect the motors 102A, 102B and the pinion gears 132, 133, the speed reducer 103 further has gears 162, 163, 172, 173 which are spur gears and movable portions 165, 166. The gears 162, 163 are connected to the motors 102A, 102B, respectively. The gear 172 is provided on the second shaft 132d of the pinion gear 132 and meshes with the gear 162. As a result, rotational torque of the shaft 122 of the motor 102A is transmitted to the pinion gear 132 via the gears 162, 172. The gear 173 is provided on the first shaft 133c of the pinion gear 133 and meshes with the gear 163. As a result, rotational torque of the shaft 122 of the motor 102B is transmitted to the pinion gear 133 via the gears 163, 173.

In this way, the shaft of the motor may not be connected to the pinion gear, but may be connected to the pinion via a transmission mechanism such as a gear.

The actuator described in the above example includes the encoder. However, instead of the encoder, the actuator may include a sensor other than the encoder that detects information on a rotation angle of the first gear. Also, the actuator may not include a sensor. When the sensor is not disposed in the opening portion 61d, a communicating path between the opening portion 61d and the hollow portion H may be provided as a wiring route.

Further, in the above-described examples, the hollow portion penetrates the first gear. However, the hollow portion may not penetrate the first gear, and may have, for example, a depressed shape. The hollow portion may have any shape as long as the first gear does not interfere with at least the inner bearing portion, when the first gear rotates around the first axis and the second gear rotates around the second axis. Also, the hollow portion may not be formed, and the first gear may be solid at all positions in the direction along the first axis.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. A speed reducer comprising:
   a first gear;
   a second gear;
   a first movable portion configured to hold the first gear to be rotatable around a first axis; and
   a second movable portion configured to hold the second gear to be rotatable around a second axis extending non-parallel to the first axis,
   wherein the first gear has a first power transmission portion that is annular and surrounds the first axis, the first power transmission portion located on one side of the first gear in a direction along the first axis,
   the second gear has an outer periphery and a second power transmission portion on the outer periphery, the second power transmission portion facing the first power transmission portion and configured to transmit power to the first power transmission portion,
   the second movable portion has an inner bearing portion located inside the first power transmission portion and an outer bearing portion located outside the first power transmission portion, the inner bearing portion and outer bearing portion each configured to support the second gear, and
   the first movable portion comprises a third bearing portion having an annular shape that defines an inner diameter and is configured to contact and hold the first gear, and wherein the inner diameter of the third bearing portion is larger than a diameter of the first power transmission portion of the first gear.

2. The speed reducer according to claim 1, wherein the first gear defines a hollow portion inside the first power transmission portion.

3. The speed reducer according to claim 2, wherein the hollow portion penetrates through the first gear in the direction along the first axis.

4. The speed reducer according to claim 2, wherein the hollow portion and the inner bearing portion overlap with each other in a plan view taken from a direction along the first axis.

5. The speed reducer according to claim 1, wherein the third bearing portion is located outside a working pitch circle of the first gear with the second gear.

6. The speed reducer according to claim 1, further comprising a unitary case configured to house the first gear and the second gear, wherein the unitary case includes:
   a first holding portion configured to hold the inner bearing portion;
   a second holding portion configured to hold the outer bearing portion; and
   a third holding portion configured to hold the third bearing portion.

7. The speed reducer according to claim 6, wherein the unitary case further includes:
   a shell portion that widens along the second axis and houses the first holding portion, wherein the second holding portion extends from the shell portion along the second axis; and
   a rib extending from the shell portion in a direction opposite the second holding portion.

8. The speed reducer according to claim 1, wherein the first power transmission portion and the second power transmission portion comprise hypoid type tooth portions, and wherein the second axis extends in a skewed orientation with respect to the first axis.

9. The speed reducer according to claim 8, further comprising:
   a third gear mounted on a third movable portion to rotate around a third axis that is parallel to the second axis.

10. The speed reducer according to claim 9, wherein the third gear comprises a third power transmission portion configured to engage the first power transmission portion, and the third movable portion has an inner bearing portion configured to hold the third gear inside the first power transmission portion and an outer bearing portion configured to hold the third gear outside the first power transmission portion.

11. An actuator comprising:
    a motor; and
    the speed reducer according to claim 1, wherein the second gear is connected to the motor.

12. The actuator according to claim 11, wherein the first gear defines a hollow portion inside the first power transmission portion.

13. The actuator according to claim 12, further comprising:
    a sensor configured to detect information on a rotation angle of the first gear, wherein at least a part of the sensor is disposed in the hollow portion.

14. The actuator according to claim 11, wherein the first gear defines a hollow portion inside the first power transmission portion, and
    wherein the hollow portion penetrates through the first gear in the direction along the first axis.

15. The actuator according to claim 11, wherein the first gear and the second gear define a working pitch circle, and
    wherein the third bearing portion is located outside the working pitch circle.

16. The actuator according to claim 11, wherein the speed reducer further comprises:
    a third gear; and a third movable portion configured to hold the third gear to be rotatable around a third axis around a third axis extending non-parallel to the first axis;

wherein the third gear has an outer periphery and a third power transmission portion on the outer periphery, the third power transmission portion facing the first power transmission portion and configured to transmit power to the first power transmission portion; and wherein the actuator further comprises a second motor to which the third gear is connected.

17. The speed reducer according to claim 1, wherein the second gear is connected to a motor.

18. The speed reducer according to claim 17, wherein the first gear defines a hollow portion inside the first power transmission portion.

19. The speed reducer according to claim 18, wherein the hollow portion and the inner bearing portion overlap with each other in a plan view taken along the first axis.

20. The speed reducer according to claim 18, further comprising:

a sensor configured to detect information on a rotation angle of the first gear, wherein at least a part of the sensor is disposed in the hollow portion.

* * * * *